United States Patent [19]

Bissonet

[11] 3,877,163

[45] Apr. 15, 1975

[54] IDENTIFICATION BRACKET

[76] Inventor: Claude Bissonet, 3747 Coronet Rd., Apt. 10, Montreal 247, Quebec, Canada

[22] Filed: Dec. 17, 1973

[21] Appl. No.: 425,629

[52] U.S. Cl. ................................................ 40/16.4
[51] Int. Cl. ............................................. G90f 3/18
[58] Field of Search ............... 248/226.A, 278, 229; 40/16.4, 10, 11, 23, 5

[56] References Cited
UNITED STATES PATENTS

| | | | |
|---|---|---|---|
| 1,810,049 | 6/1931 | Hopp | 40/5 |
| 1,909,362 | 5/1933 | Keith | 40/10 R X |
| 2,697,577 | 12/1954 | Wolf | 248/278 |
| 2,898,069 | 8/1959 | Kramer | 248/226 A |
| 3,015,897 | 1/1962 | Hopp | 40/16.4 |
| 3,557,474 | 1/1971 | Palmer | 40/10 R |
| 3,746,295 | 7/1973 | Stepanek | 248/226 A |

FOREIGN PATENTS OR APPLICATIONS 26,461  4/1932  Netherlands

Primary Examiner—Robert W. Michell
Assistant Examiner—Wenceslao J. Contreras

[57] ABSTRACT

An identification bracket for students in a class-room. The bracket is adapted to be fixed to the edge of a desk top, including a clamp and a display plate holding on one side an identification panel, namely bearing the name of the student occupying the desk, and on the opposite side with means providing a time table of the student's lecture activities for a week. The display plate can be orientated in any direction with respect to the clamp, so that the student's name can be easily read by the teacher. The clamp has a U-shape to embrace the edge of the desk top and is wide enough so that it provides a base whereby the assembly can be stood up in a stable position on the desk top surface. The top edge of the display plate is provided with a trough-like member for holding pens, pencils and the like. The device is used in class-rooms so that the teacher can readily identify each student. It is also useful in offices, for round-table conferences and similar activities.

8 Claims, 9 Drawing Figures

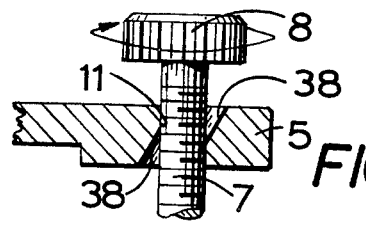
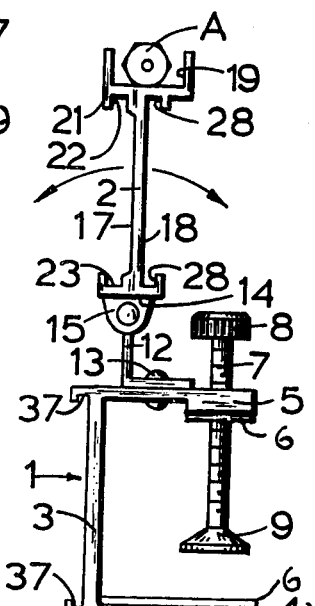
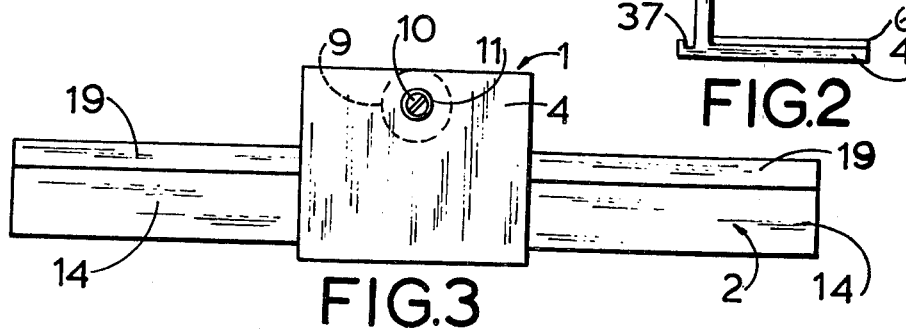
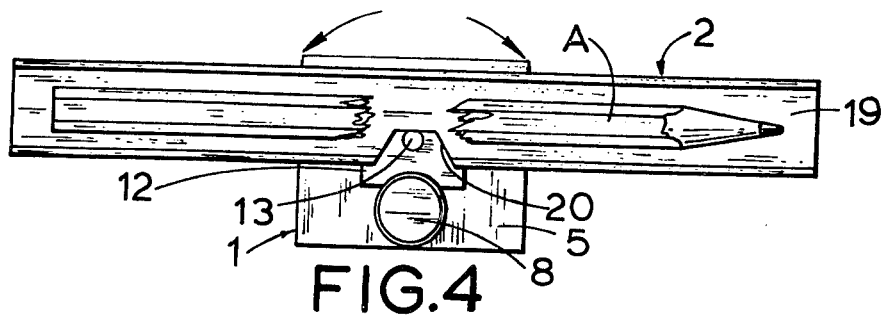

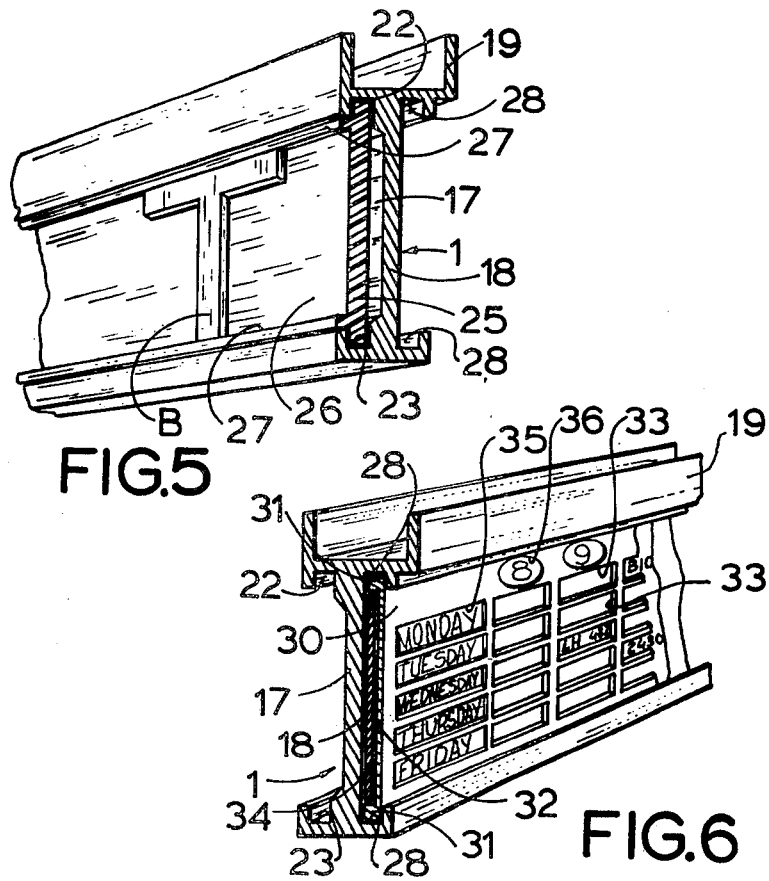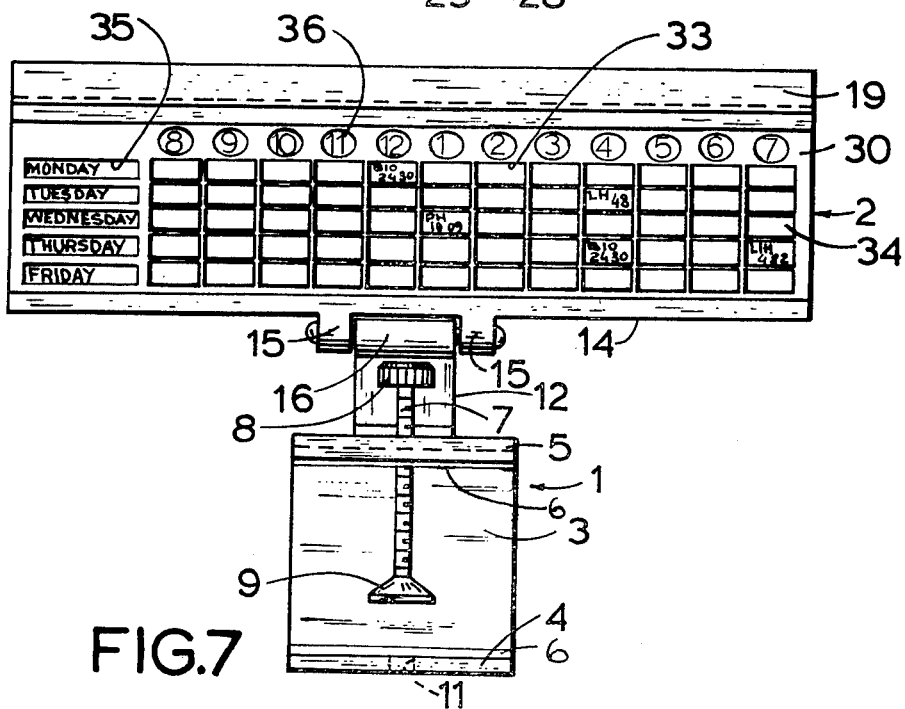

IDENTIFICATION BRACKET

The present invention relates to an identification bracket, namely a display bracket adapted to bear and display the name of a person occupying a desk, such as a student in a class-room.

Due to the large number of students in class-rooms, the teacher can seldom memorize the name of each student and personalized contact between the teacher and student is lost.

The present invention relates to a device which will overcome the above defect by providing an identification means for each student in the class, which is readily visible to the teacher, whereby the latter can call each student by his own name.

In accordance with the invention, a display bracket is provided, which can be either attached to the edge of a table or desk top, or placed directly on the desk top, which is adapted to bear an identification plate on one side, such as a student's name, adapted to be orientated towards the teacher irrespective of the position of the desk in the class-room.

In accordance with a further feature of the invention, the identification bracket is provided with means to support pens and pencils in a position readily accessible to the seated student at the desk.

In accordance with another feature of the invention, the display bracket is provided at the back, that is the face opposite the identification panel, with means providing a time table readily visible to the student, so that he may know the time of each lecture and the location of the same for the period of an entire week.

The foregoing and other objects and characteristics of the invention will become clearer during the following disclosure and by referring to the drawings, in which:

FIG. 1 is a front elevation of the display bracket;

FIG. 2 is a side elevation;

FIGS. 2a and 2b are partial cross-sections of the U-shaped clamp showing the clamping screw in releasing and clamping positions respectively;

FIG. 3 is a bottom plan view of the display bracket;

FIG. 4 is a top plan view of the same;

FIG. 5 is a partial perspective view, partially in cross-section, looking at the front of the display plate;

FIG. 6 is a partial perspective view, partially in cross-section, looking at the back of the display plate; and FIG. 7 is a back elevation of the display plate.

In the drawings, like reference characters indicate like elements throughout.

The display or identification bracket of the invention comprises a clamp 1 adapted to be removably secured to the edge of a desk or table top and a pivotable display plate 2.

The clamp 1 has a U-shaped cross-section, having a web 3, a bottom leg 4 and a top leg 5. The inside surfaces of legs 4 and 5 are lined with protecting layer 6, of rubber or the like. Legs 4 and 5 have aligned threaded holes 11 which extend through layers 6 for selectively receiving a clamping screw 7, having knurled head 8 at its outer end and a pressure pad 9 at its inner end, said pressure pad being removably secured to the clamping screw by means of a small retaining screw 10 accessible at the clamping surface of the pressure pad 9 and through the hole 11 made in the other leg and in associated protecting layer 6.

An L-shaped support 12 has one leg disposed flat on the top surface of top leg 5 of clamp 1 and is pivotally connected thereto by means of a rivet 13, which serves as a vertical pivot axis for the support relative to the clamp.

The display plate 2 has a generally rectangular shape and is provided along the central portion of its bottom edge 14 with hinge parts 15 mating with a hinge part 16 secured to the top edge of the upright leg of the L-shaped support 12. Both the rivet 13 and the hinge 15,16 constitute friction pivots whereby a certain force has to be exerted on the display plate to change its angular position about the hinge 15,16 and about the rivet 13, and once the desired orientation of the display plate is achieved, it will stay in this position.

The display plate 2 has a front face 17 and a back face 18. A U-shaped trough 19 is integral with display plate 2 and extends along the top edge thereof. Said trough 19 protrudes from the front face and back face of the plate. It serves to hold pens, pencils A or the like, which can be readily removed because the central portion of the trough is cut out, as shown at 20. The trough portion which protrudes from the front face 17 forms, with the plate and with a lip 21, a channel 22 extending longitudinally of the display plate along the top edge of the front face 17 and facing towards a bottom channel 23, which also extends longitudinally of the bottom edge of the front face 17 and is formed by a thickened portion of the bottom portion of the display plate.

An identification panel 24 can thus be frictionally inserted within the channels 22 and 23, the identification panel bearing the name of a person occupying the desk with which the identification bracket of the invention is associated. The identification panel is preferably black with the letters inscribed in white thereon.

As an alternative, a shaped strip 25 can be inserted within the channels 22,23. The strip 25 has at its front face a depressed central portion 26 on which can be adhered, or otherwise secured, prefabricated individual letters B for forming the name of the student. The strip 25 is preferably made of a dark colored plastic material with the letters appearing in white, so as to appear in white against a dark background.

The shoulders 27, which are formed by the recessed portion 26, serve to properly align and register the separate letters forming the student's name.

The back face 18 of the display plate is similarly provided with top and bottom channels 28 extending along the top and bottom edges of the back face and facing each other for the frictional insertion of an additional rectangularly shaped plate 30 having longitudinally extending top and bottom ribs 31 protruding from the back face thereof and adapted to abut against the back face 18 of the display plate, to provide a space 32 between the additional panel 30 and the display plate for the insertion of a sheet of paper 34 or cardboard. The additional panel 30 has a plurality of windows 33, whereby the sheet of paper is visible therethrough. These windows 33 are disposed in horizontal and vertical rows. The horizontal rows are identified by the five normal school days of the week: Monday through Friday, while the vertical rows are provided with hours of the day, say from 8 o'clock in the morning to 7 o'clock at night. The student inscribes on the sheet of paper through the windows 33 the code number of the lecture and the code number of the class-room where the lecture is to be held. Thus, he has a time table for the whole week, which is readily visible at all times.

The device of the invention is used as follows:

The device is normally affixed to the protruding edge of a desk, or table top or the like, by means of the clamp 1 straddling the edge portion, with the clamping screw 7 screwed down manually by head 8. Then the person occupying the desk can easily orientate the display plate about the universal joint constituted by rivet 13 and hinge parts 15,16, so as to direct his name, which appears on the front face of the display plate, towards the teacher in a class-room. The student uses the trough 19 as a convenient storage for pencils, pens and the like, which can be easily removed because the cut-out 20 permits grasping of a pen or pencil.

When clamping screw 7 is in normal position, head 8 protrudes above the top leg 5 of the U-shaped clamp 1 and prevents rotation of the L-shaped support 12 through more than about 180° about rivet 13. If it is desired to provide for a complete 360° rotation, then it is only necessary to unscrew retaining screw 10, remove the pressure pad 9, remove the clamping screw and re-insert the same in inverted position through the threaded hole 11 made in the bottom leg 4, so that now head will be below the bottom leg 4; the pressure pad is replaced in position and the device can still be clamped to a desk top. However, the clamping screw no longer obstructs for complete rotation of support 12. Thus, the device can be clamped along a desk top edge close to a wall with the identification plate panel rotated through 360° with respect to the clamp, so as to face in the general direction of the person seated at the desk.

The device can be simply stood up on a table top with the web 3 resting on said table top and supporting the display plate out of contact with the table top. The web 3 is wide and long enough to form a stable rest surface for the entire device. Because web 3 has a large outer face, an identification 29 of the school or firm can be adhered, or otherwise inscribed, on said web 3.

From the foregoing, it is realized that the identification bracket of the invention is very versatile. Although it has been described as more particularly to be used by students in a class-room for identification by the teacher, it is obvious that it could be used for other identification purposes, such as in round table discussions, television panels, assemblies, conferences and the like.

For certain applications, it will not be necessary to provide a universal joint between the clamp and the display plate. Thus, the L-shaped support 12 could be directly fixed to the clamp 1, in which case the display plate 2 would be pivotable only about the horizontal axis constituted by the hinge 15,16.

It is obvious that top leg 5 can be made long enough so that the clamping screw 7 will clear L-shaped support 12 for a complete 360° rotation thereof with the clamping screw extending through the top leg. In this case, the pressure pad 9 could be permanently rotatably secured to the clamping screw 7.

Plate 30 could be formed as a flat strip without the ribs 31, in which case these ribs 31 would be formed directly on the display plate 1 at the back face 18 thereof to still provide space 32 for the insertion of a sheet 34.

The identification of the days of the week and of the hours can be inscribed directly on plate 30 or, preferably, plate 30 can be provided with additional windows 35 and 36 in alignment with the horizontal rows and the vertical rows, respectively, of the windows 33. In this case, the student himself inscribes on the sheet of paper 34 the days of the weeks and the hours of the day. The school identification 29 can be in the form of a rigid panel removably inserted within the channels 37 facing each other and formed along the top and bottom edges of the web 3 of the clamp 1, as shown in FIG. 2.

In order to obtain quick clamping and quick release of the clamping screw 7, the system shown in FIGS. 2a and 2b is preferably used. The threaded hole 11 in the top leg 5 and also in the bottom leg 4, if so desired, is provided at the top and bottom surfaces of the leg with diametrically opposed inclined threadless enlargements or clearances 38 of a diameter slightly larger than the external diameter of the clamping screw 7, whereby the latter can be inclined with respect to the leg, as shown in FIG. 2a, to engage the clearances 38 for quick axial movement of the clamping screw. When the latter has reached a position close to its clamping position, it is caused to become upright and then it is rotated by means of its head 8 in normal manner to complete the clamping operation. To unclamp, the screw is first rotated in the unclamping direction for a few turns. Then, when it releases the desk top, it is inclined and slid upwardly within the clearances 38.

I claim:

1. An identification bracket comprising a display plate, of generally rectangular shape, having top and bottom surfaces each with longitudinal edges, and a front and back face, both said front and back faces having top and bottom longitudinally extending mutually facing channels disposed along the top and bottom longitudinal edges of said front and back faces, respectively, for slidably and frictionally receiving plates to mount thereon letters to compose a person's name and other information, hinge means along the central portion of the bottom surface of said display plate, a U-shaped clamp member having a web and two parallel legs, said hinge means being connected to one of said legs on the outside face thereof, said hinge means having a hinge axis parallel to said bottom longitudinal edge of said display plate, and a clamping screw threadedly received in a threaded hole of one of said legs to clamp said display plate to the marginal portion of a desk top or the like with said display plate pivotable about said hinge means, to take a desired pivotal position.

2. An identification bracket as claimed in claim 1, further including a trough member secured to, and extending longitudinally, of the top edge of said display plate for removably holding pens, pencils and the like, said trough having a central cut-out portion to expose diametrically opposite portions of a pencil, pen or the like for ease in grasping the same.

3. An identification bracket as claimed in claim 2, further including an L-shaped support having one leg flat against one leg of said U-shaped clamp and pivotable on the same about an axis transverse to said legs and perpendicular to the axis of said hinge means, said hinge means being connected to the other leg of said L-shaped support, whereby said display plate can be orientated in all directions with respect to said clamp.

4. An identification bracket as claimed in claim 2, wherein said clamping screw includes a pressure pad removably secured to the inner end of the same by means of a retaining screw accessible at the clamping face of said pressure pad along the axis of said clamping screw, both legs of said clamp having registering threaded holes for selectively receiving said clamping screw, said retaining screw being accessible through the threaded hole free of said clamping screw.

5. An identification bracket as claimed in claim 1, further including a letter holding strip removably inserted within said channels on said front face of said bracket and in turn having a central recessed front portion defining parallel shoulders for receiving in guided alignment a pluraltiy of separate identification letters adhering to said recessed portion.

6. An identification bracket as claimed in claim 3, further including an additional panel inserted within said channels on said back face of said bracket means holding said additional panel in a position spaced from the back face of said display plate with the resulting space serving for the insertion of a sheet of paper or the like, said additional panel having a plurality of windows disposed in vertical and horizontal rows through which said sheet of paper appears, said additional panel having along one end portion means for inscribing days of the week identifying and associated with the horizontal rows of said windows, and, along its top longitudinal edge, means for inscribing number indicating hours of the day identifying and associated with the vertical rows of said windows.

7. An identification bracket as claimed in claim 1, wherein the threaded hole receiving said clamping screw has diametrically opposite inclined clearances opening within said hole adjacent opposite surfaces of said leg, said clearances being devoid of threads and of sufficient diameter to slidably receive the clamping screw in inclined position with respect to the threaded portion of the hole, whereby the clamping screw can be axially displaced through the clearances and the hole without rotation, and when the clamping screw is in alignment with the threaded hole, it engages the threads of the latter.

8. An identification bracket as claimed in claim 1, wherein the outer surface of the web of said U-shaped clamp is provided along its top and bottom edges with parallel lips forming opposed channels for the removable insertion of an identification panel.

* * * * *